US010991046B1

(12) United States Patent
Hocaoglu et al.

(10) Patent No.: US 10,991,046 B1
(45) Date of Patent: Apr. 27, 2021

(54) HOLISTIC TRACKING AND MONITORING OF GOALS

(71) Applicant: Wells Fargo Bank, N.A., Charlotte, NC (US)

(72) Inventors: Cem Hocaoglu, Creve Coeur, MO (US); Chad Yarbrough, St. Louis, MO (US)

(73) Assignee: WELLS FARGO BANK, N.A., San Francisco, CA (US)

(*) Notice: Subject to any disclaimer, the term of this patent is extended or adjusted under 35 U.S.C. 154(b) by 998 days.

(21) Appl. No.: 14/957,672

(22) Filed: Dec. 3, 2015

(51) Int. Cl.
G06Q 40/00 (2012.01)
G06Q 40/06 (2012.01)

(52) U.S. Cl.
CPC .................... G06Q 40/06 (2013.01)

(58) Field of Classification Search
CPC ..................................... G06Q 40/06
See application file for complete search history.

(56) References Cited

U.S. PATENT DOCUMENTS

| 5,126,936 | A  | * | 6/1992 | Champion | G06Q 40/02 |
|           |    |   |        |          | 705/36 R   |
| 7,577,597 | B1 | * | 8/2009 | Allison  | G06Q 20/102|
|           |    |   |        |          | 235/379    |
| 8,498,928 | B2 |   | 7/2013 | Padgette et al. | |
| 8,768,835 | B2 |   | 7/2014 | Sanders et al.  | |

| 2003/0126054 | A1 | * | 7/2003 | Purcell, Jr. | G06Q 40/06 |
|              |    |   |        |             | 705/36 R   |
| 2004/0054610 | A1 | * | 3/2004 | Amstutz     | G06Q 40/06 |
|              |    |   |        |             | 705/36 R   |
| 2004/0267651 | A1 | * | 12/2004| Jenson      | G06Q 40/00 |
|              |    |   |        |             | 705/36 R   |

(Continued)

FOREIGN PATENT DOCUMENTS

| KR | 2014/0073064   | * | 6/2014 | ............. G06Q 10/10 |
| WO | WO-0157710 A2  | * | 8/2001 | ............. G06Q 40/06 |

(Continued)

OTHER PUBLICATIONS

O'Neill et al., "Successful Financial Goal Attainment: Perceived Resources and Obstacbles," Association for Financial Counseling and Planning Education, (Year: 2000).*

(Continued)

Primary Examiner — Alexander G Kalinowski
Assistant Examiner — William B. Bunker
(74) Attorney, Agent, or Firm — Walter Haverfield LLP; James J. Pingor

(57) ABSTRACT

Holistic tracking and monitoring of goals is provided. An indication of a first goal and a first set of attributes associated with the first goal and another indication of at least a second goal and a second set of attributes associated with the second goal are received. The first goal and at least the second goal are aggregated into a combined goal. A set of defined actions to achieve the combined goal is determined. Respective statuses of each defined action of the set of defined actions and a combined status for the combined goal are tracked. A representation of the combined status and the respective statuses are provided in a perceivable format. Further, the combined status and the respective statuses are updated in real-time.

16 Claims, 11 Drawing Sheets

(56) References Cited

U.S. PATENT DOCUMENTS

| | | | | |
|---|---|---|---|---|
| 2005/0004856 A1* | 1/2005 | Brose | ............... | G06Q 40/08 705/35 |
| 2006/0074788 A1* | 4/2006 | Grizack | ............... | G06Q 40/02 705/35 |
| 2007/0244777 A1* | 10/2007 | Torre | ............... | G06Q 40/00 705/35 |
| 2008/0147567 A1* | 6/2008 | Perry | ............... | G06Q 10/10 705/36 R |
| 2010/0280935 A1* | 11/2010 | Fellowes | ............... | G06Q 40/00 705/35 |
| 2014/0143106 A1 | 5/2014 | Fox | | |
| 2014/0279681 A1* | 9/2014 | Cole | ............... | G06Q 40/06 705/36 R |
| 2014/0279693 A1* | 9/2014 | Roy | ............... | G06Q 40/06 705/36 R |
| 2014/0304192 A1 | 10/2014 | Fiala et al. | | |
| 2016/0117771 A1* | 4/2016 | Macdonald | ............... | G06Q 40/06 705/36 R |
| 2016/0117773 A1* | 4/2016 | Lin | ............... | G06Q 40/06 705/36 R |
| 2016/0217371 A1* | 7/2016 | Leithiser | ............... | G06F 16/28 |
| 2016/0350858 A1* | 12/2016 | Dintenfass | ............... | G06Q 40/06 |

FOREIGN PATENT DOCUMENTS

| | | | | |
|---|---|---|---|---|
| WO | WO-0167340 A2 * | 9/2001 | ............... | G06Q 40/00 |
| WO | WO-2007112405 A2 * | 10/2007 | ............... | G06Q 40/02 |

OTHER PUBLICATIONS

Raymond J. Madachy, "The Modeling Process with System Dynamics," Chapter 2, IEEE, 2008 (Year: 2008).*

* cited by examiner

HOLISTIC TRACKING AND MONITORING OF GOALS

BACKGROUND

Everyone has goals in life and many of these goals require money in order to be achieved. Further, the goals may be classified as short-term goals, medium-term goals, long-term goals, and so on. In some cases, individuals create a budget and set aside money every month toward a specific goal. Further, a family may have a joint goal, such as a family vacation, and may set money aside monthly for that specific goal. However, it may be difficult for each member of the family to reconcile their goals with the family goals in the respective time desired to achieve the goals. Accordingly, one more of the financial goals might not be achieved in the given time period.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that includes a processor that executes computer executable components stored in a memory. The computer executable components may include an interaction component that receives a set of individual financial goals. The computer executable components may also include a goal manager that determines asset allocation strategies for each financial goal of the set of individual financial goals. Further, the computer executable components may include an aggregation manager that aggregates the asset allocation strategies into an overall household level strategy. The computer executable components also may include a tracking manager that monitors the overall household level strategy based on actions associated with the asset allocation strategies and implements a change to at least one asset allocation strategy of the respective asset allocation strategies. In addition, the computer executable components may include an update manager that selectively reallocates funds among individual financial goals of the set of individual financial goals based on the change to the at least one asset allocation strategy.

According to another aspect is a method that may include receiving, by a system comprising a processor, an indication of a first goal and a first set of attributes associated with the first goal and another indication of at least a second goal and a second set of attributes associated with the second goal. The method may also include aggregating, by the system, the first goal and at least the second goal into a combined goal and determining, by the system, a set of defined actions to achieve the combined goal. Further, the method may include tracking, by the system, respective statuses of each defined action of the set of defined actions and a combined status for the combined goal. The method may also include providing, by the system, a representation of the combined status and the respective statuses, wherein the combined status and the respective statuses are updated in real-time.

A further aspect relates to a computer-readable storage device that stores executable instructions that, in response to execution, cause a system comprising a processor to perform operations. The operations may include receiving a set of individual financial goals and determining asset allocation strategies for each financial goal of the set of individual financial goals. The operations may also include aggregating the respective asset allocation strategies into an overall household level strategy and monitoring the overall household level strategy based on actions associated with the respective asset allocation strategies. Further, the method may include implementing a change to at least one asset allocation strategy of the respective asset allocation strategies and selectively reallocating funds among individual financial goals of the set of individual financial goals based on the change to the at least one asset allocation strategy.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The various aspects disclosed herein provide holistic tracking and monitoring of goals and goals-based investment planning. Financial professionals may design plans that deliver a conceptual approach to achieve client goals and objectives. These investment plans may include multiple goals and multiple accounts to fund those goals. A first goal may be associated with a first financial account and a second goal may be associated with a second financial account. Thus, if the first account is overfunded and the second account is underfunded, there may be no automatic balancing between the accounts to allow for both goals to be achieved. Provided herein is an approach for not only planning holistically for all client life goals using all of the client's assets and liabilities as a whole, but also decomposes those goals into multiple single goals.

Figure 1:
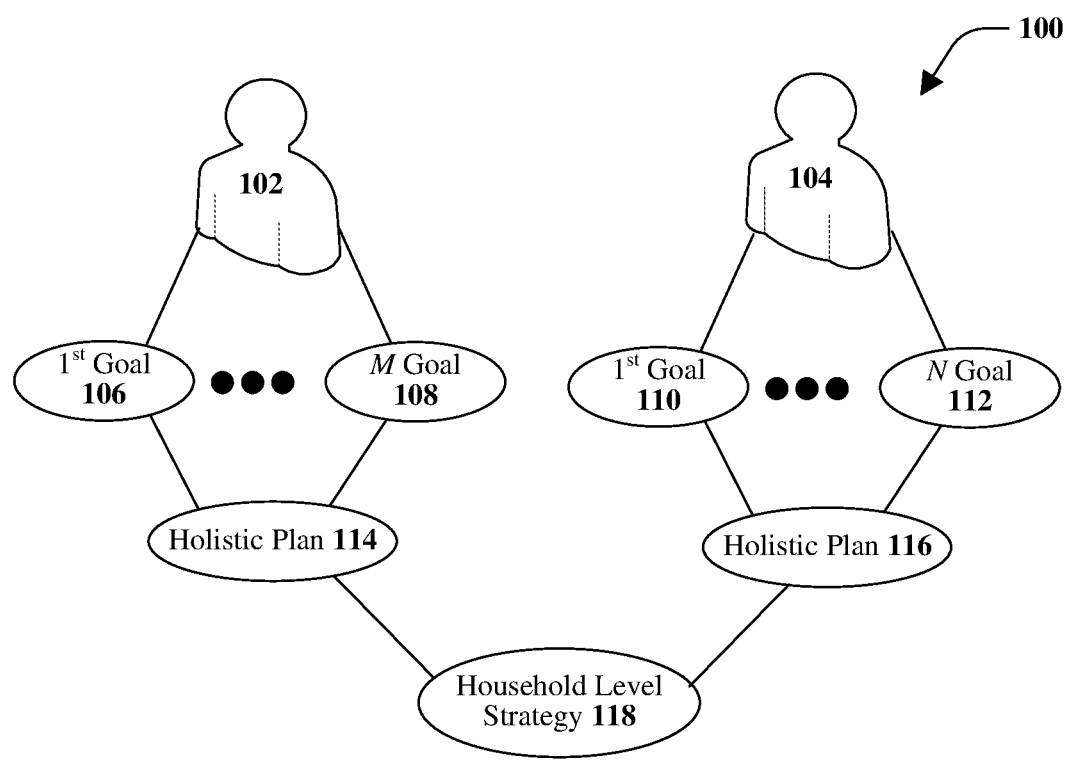
FIG. 1 illustrates an example, non-limiting schematic representation of goals, according to an aspect.

FIG. 1 illustrates an example, non-limiting schematic representation 100 of goals, according to an aspect. Illustrated are a first individual 102 and a second individual 104 that have a relationship (e.g., spouses, members of a same household, close friends, and so on). The first individual 102 may have a set of goals, illustrated as a first goal 106 through M goal 108, where M is an integer. Further, the second individual 104 may have a set of goals, illustrated as a first goal 110 through N goal 112, where M is an integer. At least one of the goals may be shared between the first individual 102 and the second individual 104 (e.g., a joint goal).

The goals of the first individual 102 are combined into a holistic plan 114 for the first individual 102. In a similar manner, the goals of the second individual 104 are combined into a holistic plan 116 for the second individual 104. Further, in the case of a joint goal, the joint goal is included in each holistic plan 114, 116. Each holistic plan 114, 116 may be aggregated into an overall household level strategy 118, as will be more fully described below.

Each of the goals may have a different investment horizon. For example, the first individual 102 may identify a two-year investment horizon for the first goal 106 and a five-year investment horizon for the M goal 108. Further, the second individual 104 may identify a nine-year investment horizon for the first goal 110 and an investment horizon of three years and seven months for the N goal 112. Accordingly, different investment strategies may be suited for each of the goals. In addition, a risk tolerance of the first individual 102 may be different from a risk tolerance of the second individual 104, which also should be taken into account when developing an investment strategy. For example, one of the individuals may be tolerance of high risk, while the other individual is more conservative.

In a similar manner, the first individual 102 and/or the second individual 104 may have one or more financial accounts associated with one or more financial entities. The different financial accounts for each individual may be evaluated separately, as well as together with the other financial accounts in order to determine funding levels for the separate goals and/or the combined goals. In some implementations, fund may be redistributed across accounts (or within a single account) depending on whether a goal is overfunding or underfunded. Such redistributed, or balancing, may be performed automatically or after approval of the owner of the account.

As used herein an "entity" or a "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution. Further, an "individual" may alternatively be referred to as a "customer," client," or "user." Thus, as used herein an "individual" refers to a customer of the financial institution and/or one or more devices managed by the customer. The client (or individual) may also be institutional investors, such as retirement/pension plans, as well as corporate clients.

Figure 2:
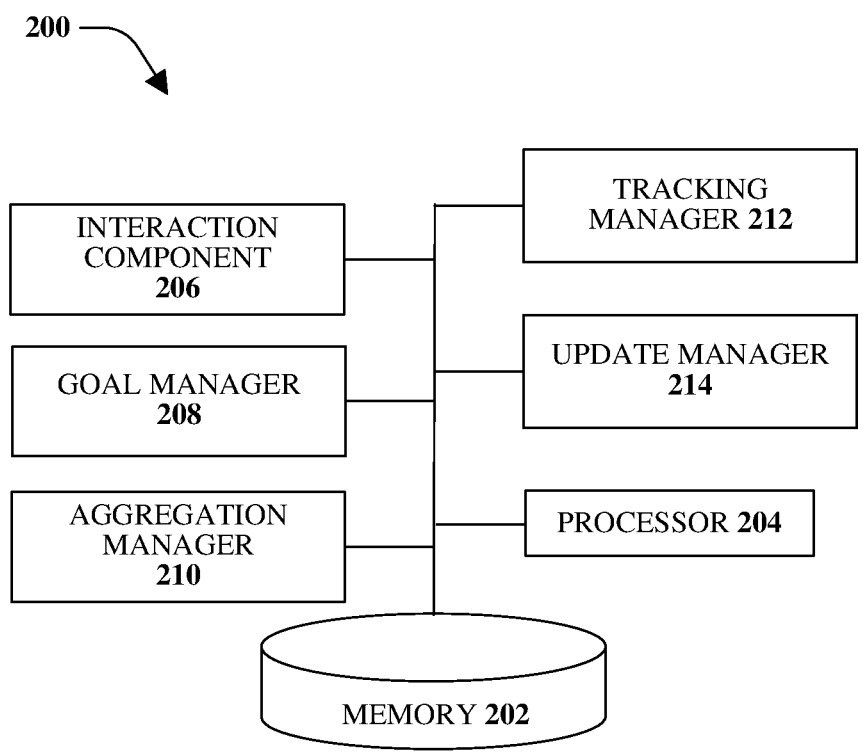
FIG. 2 illustrates an example, non-limiting system configured to provide holistic tracking and monitoring of goals, according to an aspect.

FIG. 2 illustrates an example, non-limiting system 200 configured to provide holistic tracking and monitoring of goals, according to an aspect. Clients generally have a number of financial goals they are trying to meet over the short-term (e.g., mini-vacation, holiday gifts, and so on). Clients may also have a number of financial goals they are trying to meet over a longer-term (e.g., retirement, children's college education, home purchase, and so on). The various aspects provided herein track and monitor all of a client's life goals holistically using a single investment planning process, rather than having a separate financial plan for each goal with separate financial accounts focused on each goal. The client's individual financial goals, as well as the various financial accounts the client has available to achieve these goals are captured and each of the individual goals are assigned appropriate asset allocation strategies based on a gathered risk profile, an investment objective, and investment horizon information. These goal-specific asset allocation strategies are then aggregated to create a time-based/age-based asset allocation for the entire portfolio of goals. This aggregated portfolio is then tracked and monitored for ongoing client suitability.

The system 200 may include at least one memory 202 that may store computer executable components and/or computer executable instructions. The system 200 may also include at least one processor 204, communicatively coupled to the at least one memory 202. The at least one processor 204 may facilitate execution of the computer executable components and/or the computer executable instructions stored in the at least one memory 202. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 202 (e.g., operatively connected to the at least one memory 202), the various aspects are not limited to this implementation. Instead, in accordance with various implementations, the one or more computer executable components and/or the one or more computer executable instructions may be stored in (or integrated within) the at least one memory 202. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 200 may be an interaction component 206 that may be configured to receive a set of individual financial goals. According to some implementations, the set of individual financial goals may include multiple financial goals. For example, the set of individual financial goals may include a first financial goal, a second financial goal, a third financial goal, and so on. It is noted that although only two goals may be discussed in this detailed description, the various aspects are not limited to only two goals and any number of goals may be utilized.

The interaction component 206 may receive the goals from one individual or from multiple individuals that are associated with each other (e.g., individuals in a same household). For example, the first goal may be associated with a first individual (e.g., a husband) and the second goal may be associated with a second individual (e.g., a wife). Further, one of the goals may be a joint goal (e.g., both husband and wife want to purchase a mobile home).

The association between the individuals may be predetermined. For example, a couple may have a joint banking account. In another example, individuals may have the same home address. In a further example, the individuals may have requested that at least one of their financial goals be linked together for holistic tracking and management.

The interaction component 206 may also be configured to receive or determine additional information related to the goal or to the individual(s) associated with the goal. Such information may include an investment horizon, a risk profile (which may include a risk tolerance level), a preferred investment approach, existing assets and liabilities, current financial situation, historical financial information, and so on.

It is noted that in accordance with one or more implementations described in this disclosure, users may opt-out of providing personal information, demographic information, location information, proprietary information, sensitive information, or the like in connection with data gathering aspects. Moreover, one or more implementations described herein may provide for anonymizing collected, received, and/or transmitted data. Further, a user may opt-out of providing information at any time, regardless of whether the user previously opted-in to providing the information.

The system 200 may also include a goal manager 208 that may be configured to determine asset allocation strategies for each financial goal of the set of individual financial goals. For example, the goal manager 208 may be configured to develop a portfolio of individual asset allocation strategies for each of the goals and objectives based on the risk profile and the investment horizon, which may be different for each goal.

For example, the first financial goal may include a first target funding date and a first risk tolerance. Further, the second financial goal may include a second target funding date and a second risk tolerance level. The first target funding date and the second target funding date may be different. For example, the first target funding date may be ten months and the second target funding date may be three years. Further, the first risk tolerance level may be different from the second risk tolerance level. For example, the first risk tolerance level may be a high level of risk (e.g., all stocks) and the second risk tolerance level may be a medium level of risk (e.g., 50% stocks, 50% certificate of deposit).

The goal manager 208 may be configured to evaluate the different target funding dates (e.g., investment horizon) and the different risk profiles (e.g., risk tolerances) when determining the asset allocation strategies. For example, when there is a joint goal and the individuals saving for the joint goal have different risk profiles (e.g., one is aggressive, the other is moderate), a more moderate approach may be taken. However, in some implementations, a more aggressive or less aggressive approach may be taken by weighting the risk versus benefit. If there is an investment approach that does not conform to what one of the individuals may prefer, acknowledgement from the affected individuals may be necessary before the particular asset allocation strategy is implemented. If there is no acceptance, alternative asset allocation strategies may be presented for review and acknowledgement.

Also include in the system 200 may be an aggregation manager 210 that may be configured to aggregate the respective asset allocation strategies into an overall household level strategy. Thus, each individual asset allocation strategy may be aggregated by the aggregation manager 210 into an overall time-based asset allocation for the entire portfolio. According to some implementations, the asset allocation is age-based, or both time-based and age-based.

A tracking manager 212 may be configured to monitor the overall household level strategy based on actions associated with the respective asset allocation strategies. For example, as funds are allocated for a goal, progress towards that goal is updated. In a similar manner, if funds are withdrawn from an account, the progress of the goal is updated to reflect the decrease in available funds.

Further, the system 200 may include an update manager 214 that may be configured to selectively reallocate funds among individual financial goals of the set of individual financial goals based on the change to the at least one asset allocation strategy. For example, if a goal is overfunded and another goal is underfunded, funds may be moved between the goals to rebalance the progress toward both goals.

Further, the goals may change over time. For example, today my goal may be to buy (in cash) a sports utility vehicle within five years. To achieve this goal, it is estimated that I will need to save $45,000. However, a year and a half later I am introduced to motorcycle riding and have decided to buy a motorcycle instead of a sports utility vehicle. Thus, to achieve my goal of purchasing a motorcycle, I only need to save $22,000. The various aspects disclosed herein may recalculate the savings needed over the same investment horizon (e.g., the remaining three and a half years of the original five years) or may recalculate the savings over a different investment horizon (e.g., I want to purchase the motorcycle within the next year and a half). Thus, the various aspects discussed herein are dynamic and can change based on the changing events in life.

Figure 3:
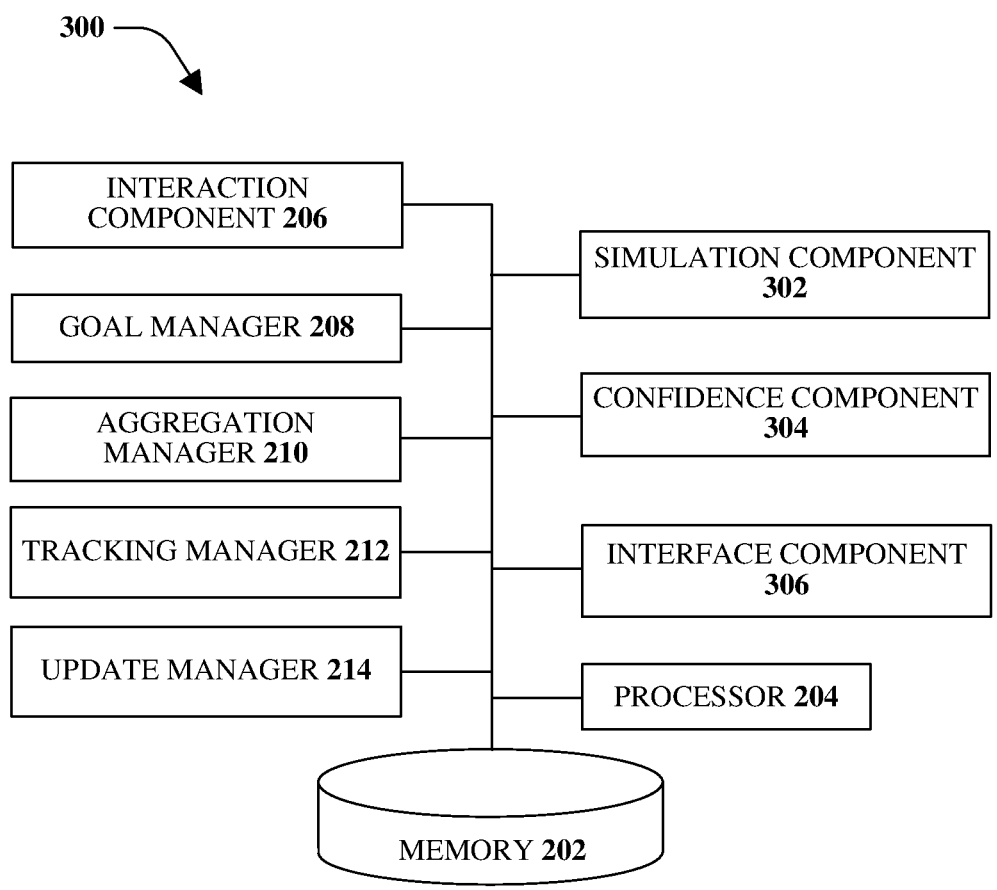
FIG. 3 illustrates an example, non-limiting system configured to output information related to goal progress, according to an aspect.

FIG. 3 illustrates an example, non-limiting system 300 configured to output information related to goal progress, according to an aspect. The system 300 may be configured to provide various information related to the goals, both individually, in combination, or overall. For example, a first person may have three goals and a second person may have four goals, where one of the goals is shared between the people. The individuals are associated as members of a same household or based on other considerations (e.g., planning to get married, share a common goal) and have authorized the disclosure of at least some of their information to the other individual(s).

The system 300 may include a simulation component 302 that may be configured to perform various simulations related to the goals. The simulations may be performed individually for each goal, or in subsets of two or more goals. Simulating combinations of goals provides information related to how each goal is funded and the effects funding a particular goal may have on another goal.

Based on the various simulations, the simulation component 302 may be configured to obtain an outcome of a first individual goal and another outcome of a second individual goal. These outcomes may be determined based on different market environments (e.g., bull market, bear market, normal market conditions, and so on) and respective asset allocation strategies developed by the goal manager 208 (or another system component).

A confidence component 304 may be configured to determine a first certainty level associated with achievement of the first individual goal. The confidence component 304 may also be configured to determine a second certainty level associated with achievement of the second individual goal. The certainty may be based, in part, on a target zone concept that defines where account balances should be at any point in time based on a threshold confidence level.

The certainty level associated with each goal may be based on the simulations performed by the simulation component 302. According to some implementations, more than one certainty level is associated with each goal, which may be based on various ones of the market environments. In another implementation, the respective certainty level for each goal may be a range of percentages related to whether the goal is expected to be achieved.

In an example of defining an education goal, a user may be stepped through a set of questions for defining the education goal. Based on the user's risk tolerance, as well as their requirements for the specific goal, an asset allocation strategy is defined. Then simulations are performed in order to provide a confidence level as to how likely the investor will succeed based on the investment strategy and the funds available for the unique goal, which may be tracked and monitored separately.

An interface component 306 may be configured to output a representation of a holistic (e.g., single) view of the set of individual financial goals as a planned result, according to an implementation. The planned result may include an indication of the confidence associated with achievement of the first goal and the second goal of the individual goals.

According to an alternative or additional implementation, the interface component 306 may be configured to output a representation of the holistic view of the set of individual financial goals as a sum result. The sum result may include the first certainty level and the second certainty level. The sum result may also include a target goal that is associated with a planned result that indicates a funding level of each of the first goal and the second goal.

In another implementation, the interface component 306 may be configured to provide a representation of the holistic view. The representation may include the actions associated with the asset allocation strategies for each goal. Further, each goal of the holistic view is separable from the holistic view. Therefore, a user may view the overall holistic view, a view for a single goal, or a view of a combination of two or more goals.

In an example, a retirement goal is to be defined based on retirement needs of the user. An allocation strategy may be developed based on those goals. A simulation is performed on the allocation strategy and a planned result is obtained based on a given confidence as to how likely the goal is likely to be achieved. Each of the goals (e.g., the retirement goal and an education goal) may be combined into a holistic view.

According to some implementations, the interaction component 206, the interface component 306, or another component may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 4:
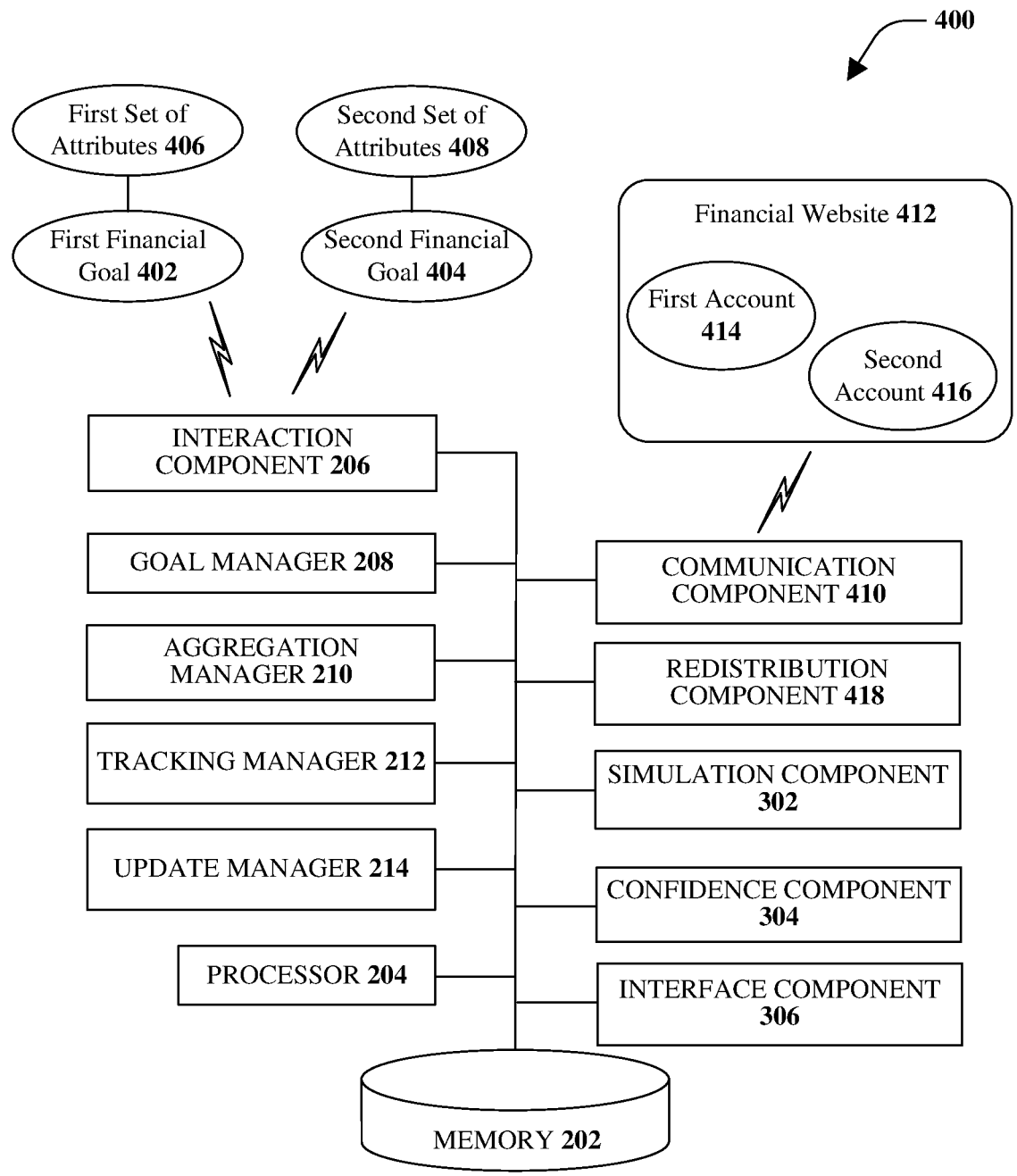
FIG. 4 illustrates another example, non-limiting representation of a system configured for holistic tracking and monitoring of goals, according to an aspect.

FIG. 4 illustrates another example, non-limiting representation of a system 400 configured for holistic tracking and monitoring of goals, according to an aspect. As illustrated, the interaction component 206 may be configured to receive various financial goals from one or more individuals. The financial goals are illustrated as a first financial goal 402 and a second financial goal 404.

The first financial goal 402 may be associated with a first set of attributes 406 and the second financial goal 404 may be associated with a second set of attributes 408. According to an implementation, the first financial goal 402, first set of attributes 406, the second financial goal 404, and the second set of attributes 408 may be received from the financial institution or from a trusted third party. For example, the individual(s) making the goals may work with a banker, a financial planner, of someone else and that other person may enter the information on their behalf.

According to an implementation, the first set of attributes 406 may include a first target funding date (e.g., how long the user has to save for the goal). The first set of attributes 406 may also include a first risk tolerance (e.g., based on a series of questions that the user answers in order to determine how risk adverse the user is toward financial risk). Further, the second set of attributes 408 may include a second target funding date, which may be different from the first target funding date. The second set of attributes 408 may also include a second risk tolerance, which may be different from the first risk tolerance.

According to some implementations, the first financial goal 402 and the first set of attributes 406 may be associated with a first user. Further, the second financial goal 404 and the second set of attributes 408 may be associated with a second user.

The goal manager 208 may be configured to determine asset allocation strategies for each financial goal of the set of individual financial goals The asset allocation strategies may indicate which account, or which portion of an account, is associated with a particular goal. The asset allocation strategies may be tailored differently for each goal as a function of investment horizons, risk profiles, and so on.

The aggregation manager 210 may be configured to aggregate the respective asset allocation strategies into an overall household level strategy. Based on this overall household level strategy, one or more individuals may save for their respective financial goals while monitoring the progress of the overall household level strategy, which may be facilitated by the tracking manager 212.

A communications component 410 may be configured to interact with at least one financial website 412 and associate a first financial account 414 with the first financial goal 402. The communications component 410 may also be configured to interact with the at least one financial website 412 and associate a second financial account 416 with the second financial goal 404. According to some implementations, the first financial account 414 and the second financial account 416 may be portions of a single account (e.g., a certificate of deposit, a stock having hundreds (or thousands) of shares, and so on).

Based on an analysis of the funding associated with each account and its related goal over time, the funding may need to be balanced among the goals. Thus, a redistribution component 418 may be configured to move funds from the first financial account 414 to the second financial account 416 based on a determination that the first financial goal 402 is overfunded and the second financial goal 404 is underfunded. In another example, the redistribution component 418 may be configured to move funds from the second financial account 416 to the first financial account 414 based on a determination that the second financial goal 404 is overfunded and the first financial goal 402 is underfunded.

The rebalancing of the accounts may be dynamic, such that the redistribution component 418 automatically rebalances the accounts without interaction from the user. However, according to some implementations, a notification is provided and confirmation of the rebalancing is received before the redistribution component 418 adjusts the funding of the goals. After the accounts are rebalanced, confidence levels may be recalculated. This global view allows for the rebalancing because the accounts are viewed together instead of separately. Further, when a new goal is added (or a goal is removed), the confidence levels may be recalculated based on updated asset allocation strategies.

Figure 5:
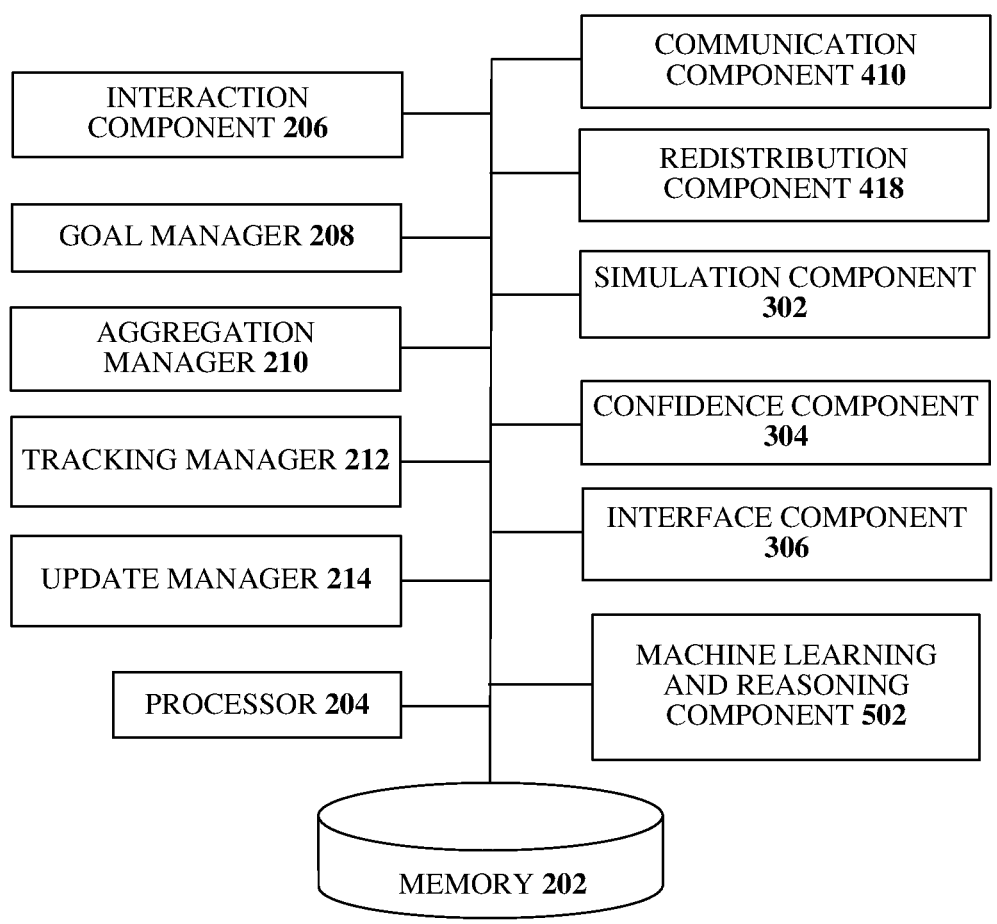
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. As discussed herein, a multi-year strategy for achieving financial goals based on goal setting and scenario planning is provided. The various aspects provide holistic planning of all life goals by analyzing all assets, liabilities, and future goals for an entire household.

For example, a machine learning and reasoning component 502 may be utilized to automate one or more of the disclosed aspects related to holistic financial planning and management. The machine learning and reasoning component 502 may employ automated learning and reasoning procedures (e.g., the use of explicitly and/or implicitly trained statistical classifiers) in connection with evaluating individual goals and household goals and providing holistic or comprehensive planning for achievement of those goals in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer actions or events that should be implemented by obtaining knowledge about goals and attributes, market conditions, anticipated future market conditions and/or events, and so on. The attributes may relate to user preferences, investment horizon, risk profile, and so on. According to some implementations, actions or event that should be implemented may be determined based on one or more simulations that are performed to anticipate whether a particular goal is likely to be achieved. Based on the various simulations, the machine learning and reasoning component 502 may make an inference related to actions that should be continued, modified, or stopped in order to increase a likelihood that one or more goals will be achieved.

As used herein, the term "inference" refers generally to the process of reasoning about or inferring states of the system, a component, a module, the environment, and/or user devices from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

If the machine learning and reasoning component 502 has uncertainty related to whether a certain action and/or event should be implemented or modified, the machine learning and reasoning component 502 may automatically engage in a short (or long) dialogue or interaction with the user. For example, the user may be presented with alternative actions that may be used to increase a likelihood of achieving the goal (e.g., increase an amount saved each week or move into a more aggressive, higher risk stock). In accordance with some aspects, the machine learning and reasoning component 502 engages in the dialogue with the user through another system component. Computations of the value of information may be employed to drive the asking of questions.

The various aspects (e.g., in connection with evaluating goals, providing a comprehensive overview of goals, determining a confidence level related to accomplishment of single goals and comprehensive goals, and so forth) may employ various artificial intelligence-based schemes for carrying out various aspects thereof. For example, a process for determining if a particular action should be implemented to achieve a goal may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to achieve a goal, determine what actions should be automatically performed, what actions should be performed after receiving confirmation from the user to proceed, and so forth. In the case of actions/events, for example, attributes may be identification of a user defined goal and user preferences and the classes may be criteria related to known information (e.g., historical information) about the user and/or the goal.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing fraud trends, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to provide a suggested action (e.g., change a funding level, change a funding type), when to complete a current action (e.g., rebalance funds, which actions to implement in sequence), and so forth. The criteria may include, but is not limited to, historical information, user preferences, expected actions, progress towards one or more goals, and so forth.

Additionally or alternatively, an implementation scheme (e.g., a rule, a policy, and so on) may be applied to control and/or regulate events and resulting recommendations, subsequent events, and so forth. In some implementations, based upon a predefined criterion, the rules-based implementation may automatically and/or dynamically implement one or more portions of an event/action. In response thereto, the rule-based implementation may automatically interpret and carry out functions associated with the event/action by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
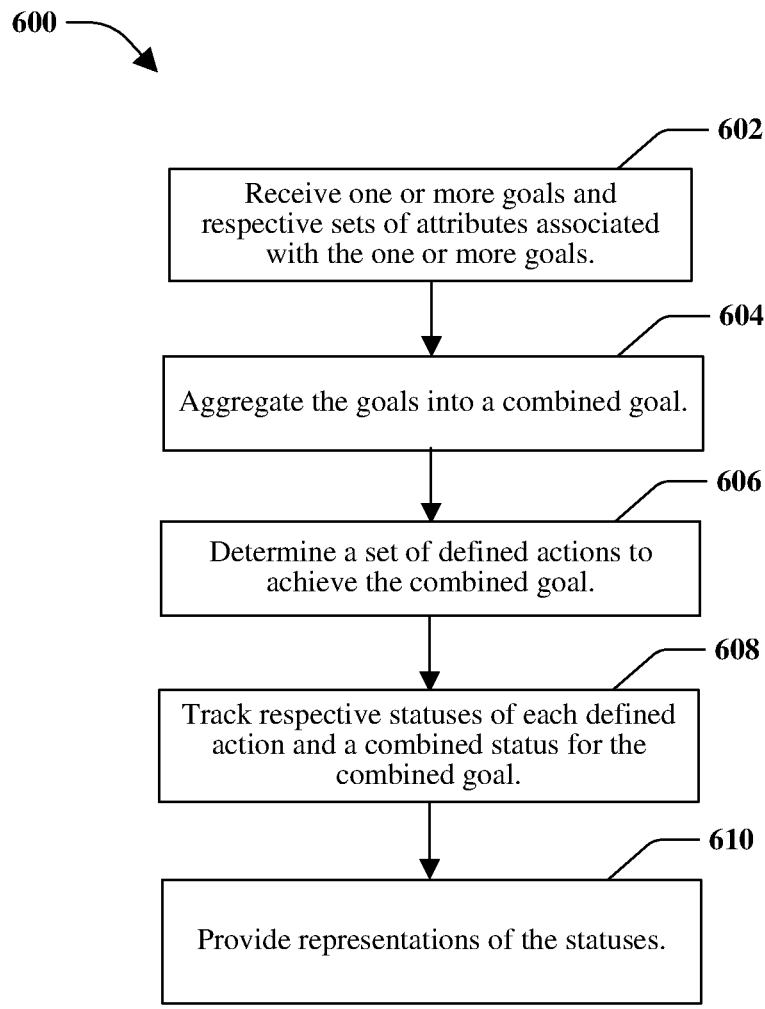
FIG. 6 illustrates an example, non-limiting method for providing comprehensive goal planning and monitoring, according to an aspect.

FIG. 6 illustrates an example, non-limiting method 600 for providing comprehensive goal planning and monitoring, according to an aspect. The method 600 in FIG. 6 may be implemented using, for example, any of the systems, such as the system 200 (of FIG. 2), described herein.

Method 600 starts at 602 when an indication of one or more goals and a set of attributes associated with the one or more goals are received. For example, a first goal and a first set of attributes associated with the first goal may be received. Further, at least a second goal and a second set of attributes associated with at least the second goal may also be received. Subsequent goals and subsequent sets of attributes may also be received.

At 604, the first goal and at least the second goal are aggregated into a combined goal. The aggregation of the goals may be performed based on the respective investment horizons, risk profiles, progress already may toward one or more of the goals, and other information.

A set of defined actions to achieve the combined goal is determined at 606. The set of defined actions may be separable between a first subset of defined actions for the first goal and at least a second subset of defined actions for at least the second goal.

At 608, respective statuses of each defined action of the set of defined actions are tracked. Also tracked may be a combined status for the combined goal.

Representations of the combined status and the respective statuses is provided, at 610. The representations may be updated in real-time or based on other factors (e.g., user request, a change to one or more funding level of a goal, a modification to one or more of the goals, and so on).

According to some implementations, the first set of attributes may include a first target funding date and a first risk tolerance. Further, the second set of attributes may include a second target funding date and a second risk tolerance. The first target funding date and the first risk tolerance may be different from the second target funding date and the second risk tolerance. In accordance with some implementations, the first goal and the first set of attributes may be associated with a first individual and the second goal and the second set of attributes may be associated with a second individual.

Figure 7:
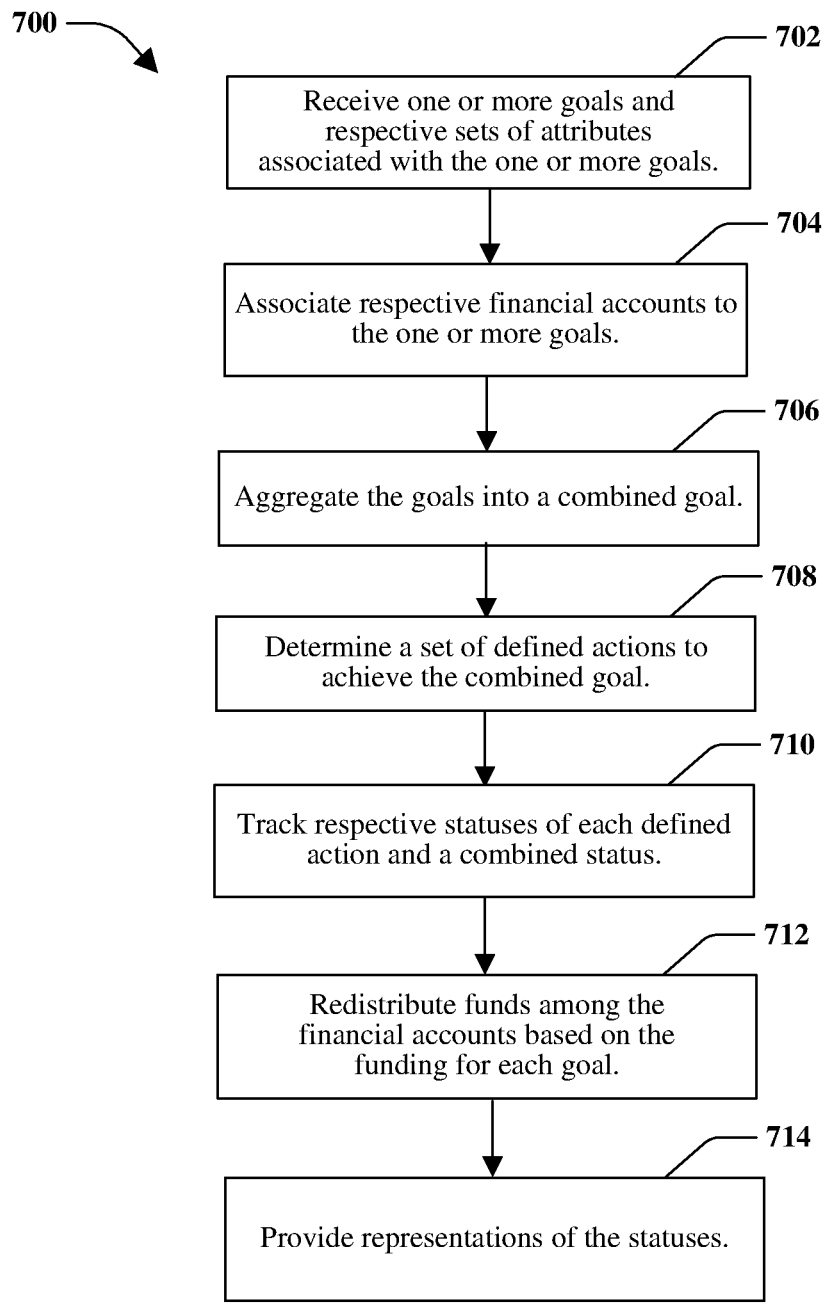
FIG. 7 illustrates an example, non-limiting method for goal planning and monitoring, according to an aspect.

FIG. 7 illustrates an example, non-limiting method 700 for goal planning and monitoring, according to an aspect. The method 700 in FIG. 7 may be implemented using, for example, any of the systems, such as the system 300 (of FIG. 3), described herein.

The method 700 starts at 702 when one or more goals and a respective set of attributes associated with the one or more goals are received. For purposes of simplicity, the one or more goals will be discussed with respect to a first goal and a second goal (although more than two goals may be defined). The goals may be received from a single person, or from two or more persons.

At 704, financial accounts are associated with the goals. For example, a first financial account may be associated with the first goal and a second financial account may be associated with the second goal. According to some implementations, portions of one financial account are associated with the goals. For example, a first portion of the financial account may be associated with the first goal and a second portion of the financial account may be associated with the second goal.

The goals are aggregated into a combined goal, at 706. The aggregation of the goals may take into account the attributes for each goal. According to some implementations, the attributes may include a risk tolerance, an investment horizon, an identification of an individual to which the goal belongs, an amount of money (or other resources) already available for the goal, and so on.

At 708, a set of defined actions to achieve the combined goal is determined. Actions included in the set of defined actions may be to allocate a certain amount of money to a specific financial account on a predetermined schedule (e.g., every week, bi-weekly, every month, and so on).

Respective statuses of each defined action, as well as a combined status (for the combined goal), is tracked, at 710. Based on the statuses, at 712, funds may be redistributed between the financial accounts. For example, based on a determination that the first goal is overfunded and the second goal is underfunded, funds are redistributed from the first financial account to the second financial account. In another example, based on a determination that the second goal is overfunded and the first goal is underfunded, funds are redistributed from the second financial account to the first financial account. According to some implementations, before the funds are redistributed at 712, a confirmation and/or approval is received from the individual. However, accounting to some implementations, the redistribution is performed automatically.

At 714, representations of the statuses are provided. The representations may be in any perceivable format (e.g., visual, audio, haptic, and so on). According to some implementations, an overall status is provided and the user may interact with the financial website (or through another computing media) to drill down into one or more of the individual goals to obtain further details for that specific goal.

Figure 8:
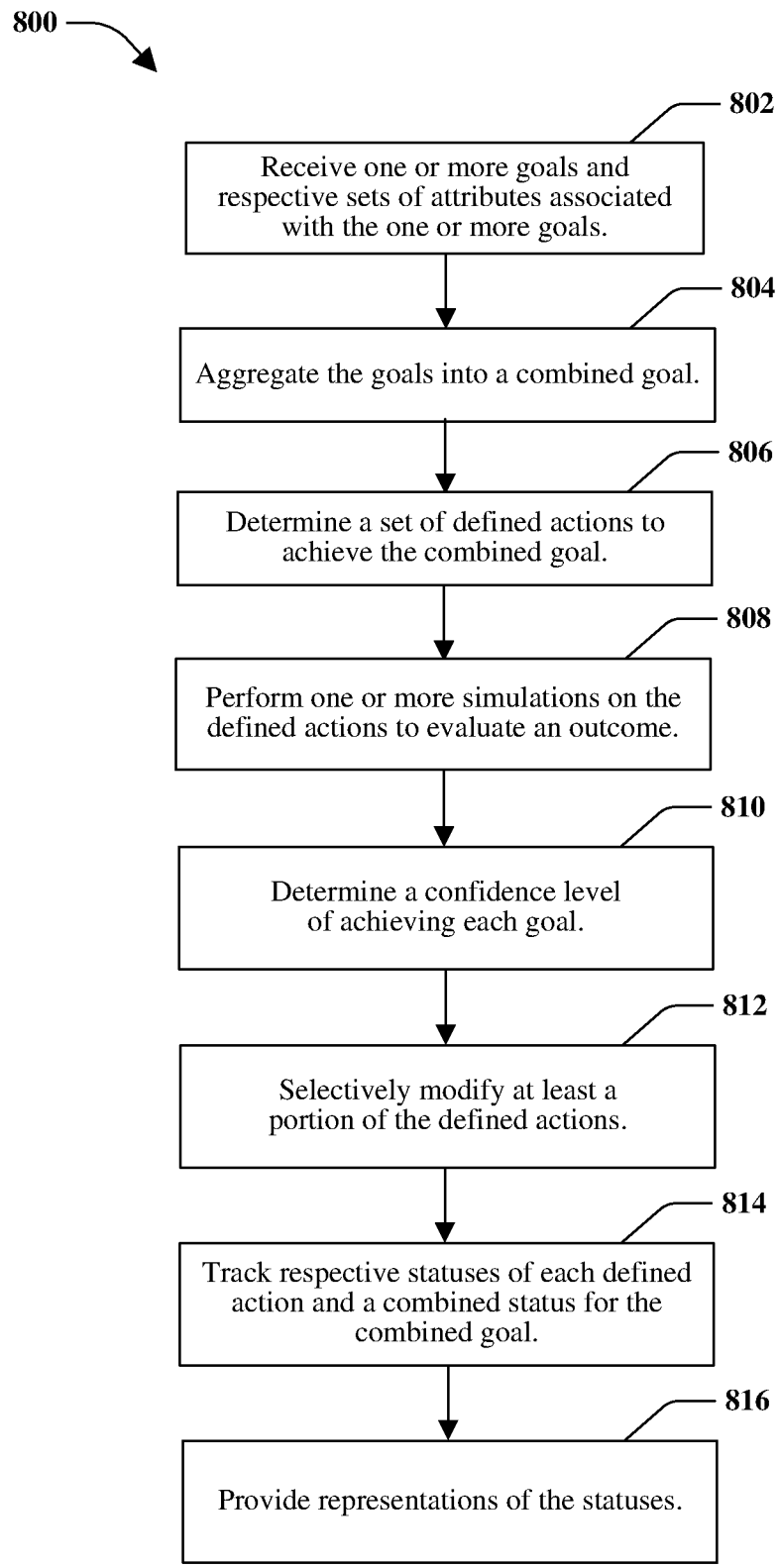
FIG. 8 illustrates an example, non-limiting method for assisting an individual to achieve financial goals, according to an aspect.

FIG. 8 illustrates an example, non-limiting method 800 for assisting an individual to achieve financial goals, according to an aspect. The method 800 in FIG. 8 may be implemented using, for example, any of the systems, such as the system 400 (of FIG. 4), described herein.

Various goals and related attributes are received at 802. The various goals may be received from one individual, or from multiple related individuals, which may be members of a single household, or may be related based on other factors. For example, the individual may have specified that their goals be combined, such as for a couple planning to be married in the next few years.

At 804, the various goals are aggregated to create a holistic goal. The aggregation of the goals takes into account the related attributes. For example, a first goal is received from a first individual that has a short investment horizon and a high-risk tolerance and the second goal is received from a second individual that has a long investment horizon and a low risk tolerance. In this case, the aggregation may take into account the varying investment horizons and the different risk tolerances to determine the outcome of the holistic goal.

At 806, a set of defined actions to achieve the goals may be determined. The defined actions may be based, at least in part, on the attributes associated with each goal (or individual). Continuing the above example, defined actions for the first goal will be more aggressive than the second goal due to the short investment horizon for the first goal and the more aggressive (e.g., high-risk tolerance) associated with the first individual.

One or more simulations are performed, at 808, on the defined actions to determine an outcome. According to an implementation, the outcome may include a likelihood of whether the goal will be achieved in the investment horizon specified. More than one simulation may performed for each goal and/or for each different goal. These simulations may include different market conditions, which may fluctuate over time. As actual market conditions change, further simulations may be performed to make sure the asset allocation strategies are still effective for achievement of the goals.

At 810, confidence levels of achieving each goal are determined. For example, the first goal may be associated with a first confidence level and the second goal may be associated with a second confidence level. The confidence levels may be determined based on the various simulations. In some implementations, more than one confidence level may be associated with each goal. These different confidence levels may be a function of the different market conditions simulated at 808.

Based on the confidence level associated with each goal, at least a portion of the defined actions may be selectively modified, at 812. For example, if a confidence level associated with one or more of the goals is below a predefined threshold level, additional simulations may be performed, at 808, to determine if different actions may have a more positive outcome given a market condition. In some cases, the different actions may include saving more aggressively (e.g., instead of saving $50 a month, the individual will need to save $75 a month). In other cases, the different actions may include distributing funds among different accounts (e.g., saving a first portion of money in a savings account and a second portion of money in a stock fund, wherein both the first portion and the second portion are designated for a single goal).

Over time, the statuses of each defined action, as well as a combined status for the combined goal are tracked, at 814. The tracking may take into account extra financial resources that may be available (e.g., the individual has started working overtime and has extra money being placed into one or more financial accounts). In another example, the tracking may indicate that the stock market is on the rise and stocks associated with one goal have risen significantly. Thus, it might be time to sell the stock asset or perform another action to take advantage of the rise in the asset value.

The representation of the statuses may be output, at 816. For example, the output may include a graph or chart showing each goal and the amount of progress made toward that goal. However, the disclosed aspects are not limited to this implementation. Instead, the output may be in any format (e.g., visual, audible, and so on), provided that the output is perceivable to the user and is readily understood by the user. According to some implementations, the user may modify the type of output. For example, the user may be presented with a graph showing the percentage of progress toward each goal. After viewing this, the user may desired to drill into a specific goal in order to evaluate that goal in further detail.

Figure 9:
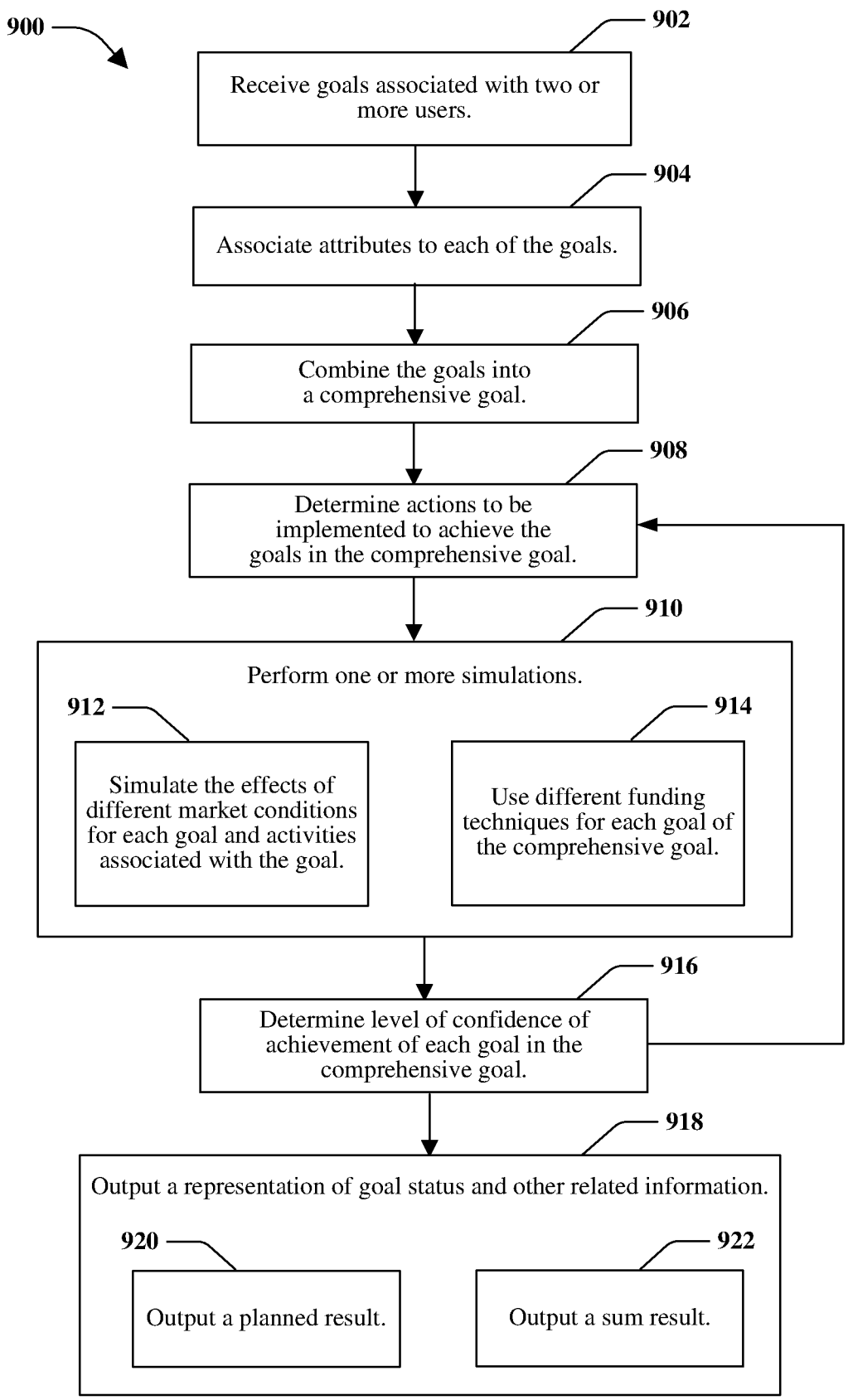
FIG. 9 illustrates an example, non-limiting method for providing information related to goal planning and progress, according to an aspect.

FIG. 9 illustrates an example, non-limiting method 900 for providing information related to goal planning and progress, according to an aspect. The method 900 in FIG. 9 may be implemented using, for example, any of the systems, such as the system 200 (of FIG. 2), described herein.

At 902, a first goal is received from a first user and a second goal is received from a second user. The first user and the second user may be members of a household or may be related in a different manner (e.g., co-owners of a business, friends, and so on). The determination of whether users are related may be based on preferences of the users. In the example where the users are co-owners of a business, each user may be associated with two distinct set of users. For example, a first set of users may include the co-owners, wherein each co-owner is associated with a second set of users that includes themselves and their spouse (where the other co-owner does not have access to the respective second set).

Attributes are associated with each goal, at 904. The attributes may be defined with the goal (e.g., I want to save $4,500 for vacation in two years). In another example, one or more attribute may be determined based on historical information associated with the user. For example, if the user invests heavily in the stock market, it might be inferred that the user has a high-risk tolerance level. In another example, the attributes may be determined based on responses from the user related to the goal (e.g., "Do you have plans as to how you plan to achieve the goal(s)?" "Do you have another income source?" and so on).

The goals are combined, at 906, into a comprehensive goal that may include one or more stages or milestones. For example, the goals may have different investment horizons, wherein one goal may be realized before the other goals. Thus, when funding for the goal is completed, it may mark a milestone for that goal and the funds may continue to accumulate, or may be expended to fulfil the purpose of the goal.

At 908, various actions that may be implemented to achieve the goals included in the comprehensive goal are determined. Actions may include a specific amount of money to put aside each month, details as to where to put the money, actions to take to save the money (including which actions may be discontinued, such as going out for coffee every day), and others.

Various simulations are performed, at 910, to determine if the comprehensive goal and/or each individual goal is likely to be achieved. According to an implementation, performing the simulations may include using different market conditions during the simulations, at 912. According to an additional implementation, performing the simulation may include using different funding techniques for one or more goals of the comprehensive goal, as 914. Examples of funding techniques may include using a banking account, investing in the stock market, investing in mutual funds, funding a 401K at work, funding a Roth or Traditional IRA, purchasing real estate, getting another job, selling assets, reducing liabilities, extending the investment horizon of the goal by a specific number of months or years, and so on.

At 916, a level of confidence associated with achievement of each goal is determined. If the level of confidence is below a threshold level (e.g., 60%, 75%, 90%, and so on), the method 900 may return to 908 where the recommended actions are revaluated. It is to be understood that evaluating the actions to be implemented at 908, the simulations at 910, 912, 914, and determining the level of confidence at 916, may be recursive. For example, the data may be reviewed for either (or both) percentage completion toward the goal, and confidence whether the goal will be completed in the desired time frame (e.g., investment horizon). These actions may be performed continuously, periodically, at variable intervals, or based on another parameter (e.g., at least a set of the data has changed, new data has been entered, a query has been executed on the data, a user request, and so forth). Further, these actions may be performed in real-time. For example, when a deposit is made to a financial account, the confidence level of accomplishing the goal may be recalculated and evaluated. The user may be provided with the confidence level and with encouragement to continue the progress toward the goal(s).

At 918, a representation of the combined goal status may be output. Also output may be status of each individual goal, the confidence level (which may be expressed as a percentage), and other information may be provided. According to an implementation, the representation is provided in a visual format, an audio format, or in another type of format (e.g., haptic feedback).

According to an implementation, outputting the representation may include outputting a planned result, at 920. The planned result may include a confidence associated with achievement of each goal, which is determined based on simulations performed using different market environments.

In accordance with an additional or alternative implementation, outputting the representation may include outputting a sum result, at 922. The sum result may include a level of confidence associated with fulfilling each of the goals. Further, the sum result may include a target goal associated with a planned result that indicates a funding level of each of the first goal and at least the second goal.

One or more implementations include a computer-readable medium including processor-executable instructions configured to implement one or more embodiments presented herein. As discussed herein the various aspects enable the aggregation of portfolio allocation strategies for individual goals into an aggregated portfolio allocation across all goals. Further, provided is the ability to manage the aggregated portfolio allocation holistically across all accounts rather than having to have separate accounts for each individual goal. Also provided is the ability to track and monitor the ongoing performance of the aggregated portfolio allocations as goals age and help ensure ongoing needs of the client are achieved.

Figure 10:
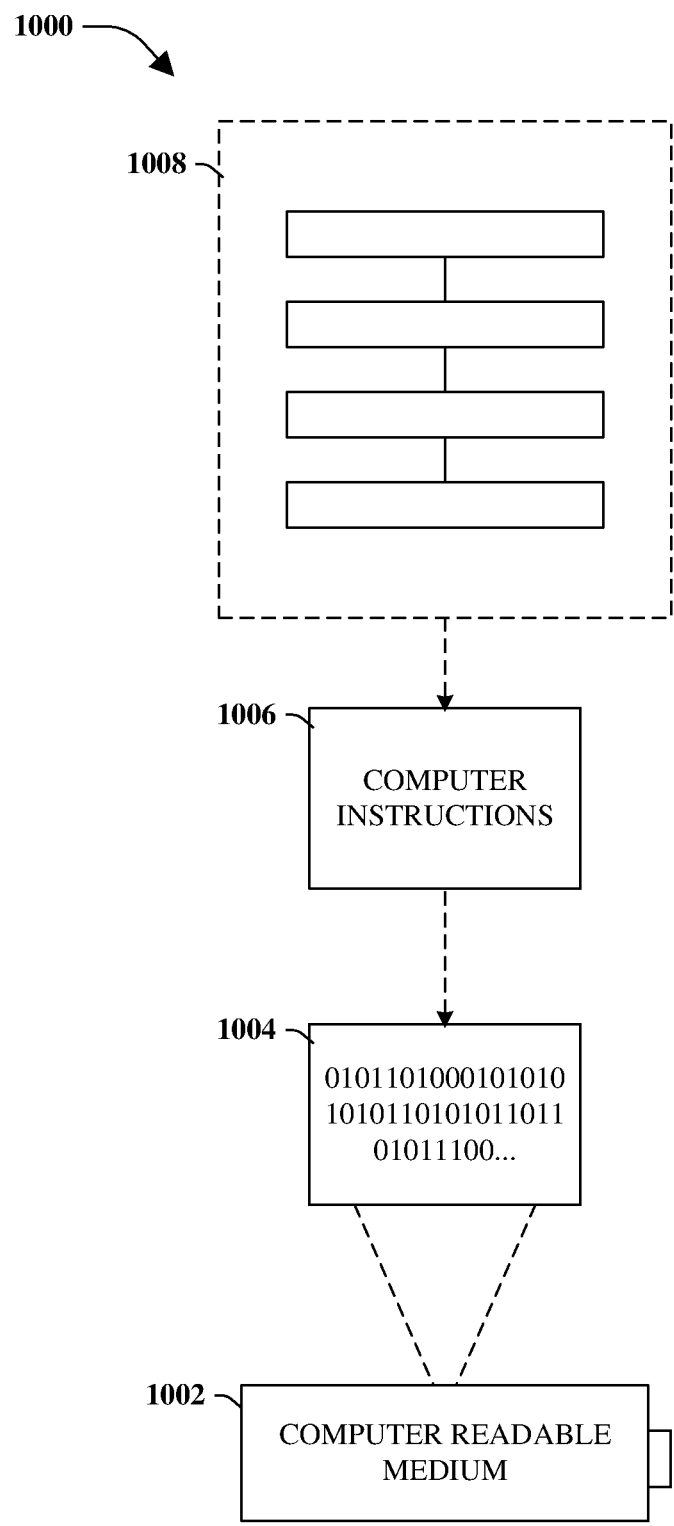
FIG. 10 illustrates an example, non-limiting computer-readable medium or computer-readable device including processor-executable instructions configured to embody one or more of the aspects set forth herein.

An embodiment of a computer-readable medium or a computer-readable device devised in these ways is illustrated in FIG. 10, wherein an implementation 1000 includes a computer-readable medium 1002, such as a CD-R, DVD-R, flash drive, a platter of a hard disk drive, and so forth, on which is encoded computer-readable data 1004. The computer-readable data 1004, such as binary data including a plurality of zero's and one's as illustrated, in turn includes a set of computer instructions 1006 configured to operate according to one or more of the principles set forth herein.

In the illustrated embodiment 1000, the set of computer instructions 1006 (e.g., processor-executable computer instructions) may be configured to perform a method 1008, such as the method 600 of FIG. 6 and/or the method 800 of FIG. 8, for example. In another embodiment, the set of computer instructions 1006 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
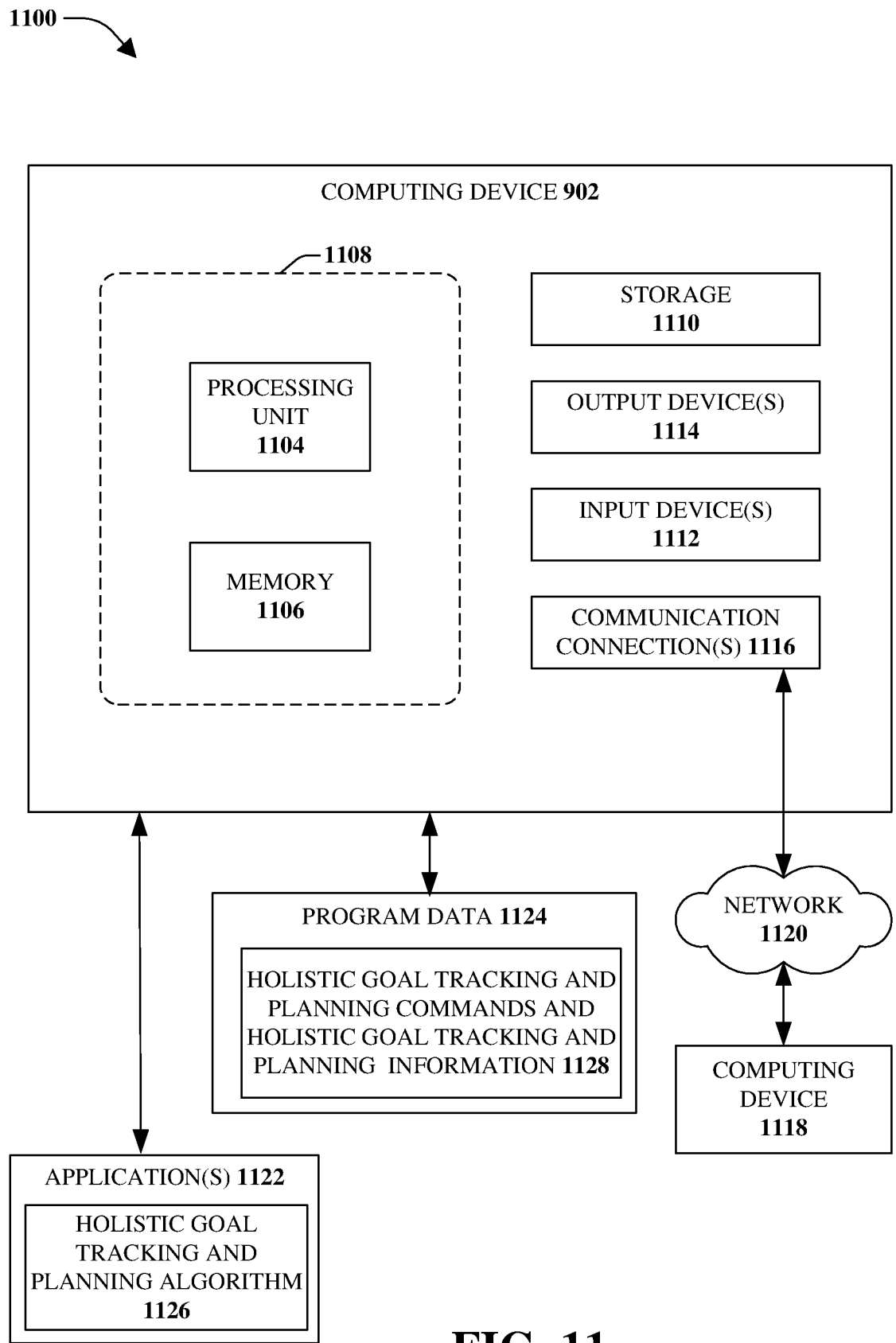
FIG. 11 illustrates an example, non-limiting computing environment where one or more of the aspects set forth herein are implemented, according to one or more aspects.

FIG. 11 and the following discussion provide a description of a suitable computing environment to implement embodiments of one or more of the aspects set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 that may include a computing device 1102 configured to implement one or more embodiments provided herein. In one configuration, the computing device 1102 may include at least one processing unit 1104 and at least one memory 1106. Depending on the exact configuration and type of computing device, the at least one memory 1106 may be volatile, such as RAM, non-volatile, such as ROM, flash memory, etc., or a combination thereof. This configuration is illustrated in FIG. 11 by dashed line 1108.

In other embodiments, the computing device 1102 may include additional features or functionality. For example, the computing device 1102 may include additional storage such as removable storage or non-removable storage, including, but not limited to, magnetic storage, optical storage, etc. Such additional storage is illustrated in FIG. 11 by storage 1110. In one or more embodiments, computer readable instructions to implement one or more embodiments provided herein are in the storage 1110. The storage 1110 may store other computer readable instructions to implement an operating system, an application program, etc. Computer readable instructions may be loaded in the at least one memory 1106 for execution by the at least one processing unit 1104, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1102 may include input device(s) 1112 such as keyboard, mouse, pen, voice input device, touch input device, infrared cameras, video input devices, or any other input device. Output device(s) 1114 such as one or more displays, speakers, printers, or any other output device may be included with the computing device 1102. The input device(s) 1112 and the output device(s) 1114 may be connected to the computing device 1102 via a wired connection, wireless connection, or any combination thereof. In one or more embodiments, an input device or an output device from another computing device may be used as the input device(s) 1112 and/or the output device(s) 1114 for the computing device 1102. Further, the computing device 1102 may include communication connection(s) 1116 to facilitate communications with one or more other devices, illustrated as a computing device 1118 coupled over a network 1120.

One or more applications 1122 and/or program data 1124 may be accessible by the computing device 1102. According to some implementations, the application(s) 1122 and/or program data 1124 are included, at least in part, in the computing device 1102. The application(s) 1122 may include a holistic goal tracking and planning algorithm 1126 that is arranged to perform the functions as described herein including those described with respect to the system 400 of FIG. 4. The program data 1124 may include holistic goal tracking and planning commands and holistic goal tracking and planning information 1128 that may be useful for operation with holistic tracking and monitoring of goals as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A financial website system for tracking financial goals of a first individual user and a second individual user of the same household who have at least first and second individual financial goals and at least one joint goal, the system, comprising:
    a computing device of the first or second individual user having a communications component in electronic communication with the financial website, the website comprising a first financial account associated with the first individual goal and the joint goal and a second financial account associated with the second individual goal, wherein each financial account has a plurality of funding techniques associated with it;
    a processor of the computing device that executes the following computer executable components stored in a memory:
        an interaction component comprising a graphical user interface (GUI) for entering a set of financial goals including a target funding date for each of the first and second individual financial goals and the joint goal, wherein the GUI allows the first or second individual user to enter data related to the set of financial goals and associate the first individual with the first individual goal and the second individual with the second financial goal and to designate the joint goal as a joint goal;
        a goal manager that determines asset allocation strategies for each of the first and second individual financial goals and the joint goal of the set of financial goals based at least in part on the data, wherein the goal manager associates a financial account with each goal;
        an aggregation manager that:
            aggregates the first financial goal and the second financial goal and the joint goal into a combined goal based at least in part on an attribute for each goal, wherein the attribute comprises at least one of a risk tolerance, an investment horizon, an identification of an individual to which the goal belongs, and an amount of resources already available for the goal, and
            aggregates the asset allocation strategies into an overall household level strategy to achieve the combined goal, wherein the combined goal is aggregated on a time-based asset allocation for the first and second financial accounts;
        a simulation component that simulates outcomes for the first and second financial goals and the joint goal based on the asset allocation strategies, wherein the simulations determine whether the combined goal is likely to be achieved based on the simulation of the first and second individual goals and the joint goal and based on various events and market conditions, the simulations further comprising use of different funding techniques associated with the first and second financial accounts;
        a machine learning and reasoning component that uses an explicitly trained statistical classifier to:
            infer whether actions associated with the asset allocation strategies should be implemented, continued, modified or stopped in order to achieve the combined goal based at least in part on data obtained about each financial goal, the attribute for each goal, market conditions, and anticipated market conditions, wherein the inferences are based on actions or events determined by the simulation component;
            present to the first or second individual user alternative actions that may increase the likelihood of achieving the combined goal, wherein the alternative actions comprise different asset allocations or funding techniques associated with the first and second financial accounts;
            determine which, if any, actions should be performed based on input from the user;
        a tracking manager that monitors the overall household level strategy based on actions associated with the asset allocation strategies for each financial goal of the set of financial goals and implements a change to at least one asset allocation strategy of the respective asset allocation strategies based on the monitoring and the inference by the reasoning component;
        an update manager that selectively reallocates funds among the financial accounts associated with at least one of the individual financial goals of the set of individual financial goals based on the change to the at least one asset allocation strategy; and
        an interface component that outputs a representation that includes actions associated with the asset allocation strategy for each financial goal of the set of financial goals, wherein the representation is selectable from a holistic view of the set of financial goals, a view for a single goal among the set of financial goals, or a view of a combination of two or more goals among the set of financial goals.

2. The system of claim 1, wherein,
the simulation component obtains an outcome of the first and second individual financial goals and the joint goal based on a set of simulations performed using different market environments and the respective asset allocation strategies; and
a confidence component that determines a first certainty level associated with an achievement of the first individual goal and at least a second certainty level associated with another achievement of at least the second individual goal.

3. The system of claim 1, further comprising:
a confidence component that determines a first certainty level associated with achievement of the first individual financial goal and a second certainty level associated with achievement of the second individual financial goal, and a third certainty level associated with achievement of the joint goal; and
wherein the interface component further outputs a representation of a holistic view of the set of financial goals as a sum result that includes the first certainty level, the second certainty level, the third certainty level, and a target goal associated with a planned result that indicates a funding level of each of the first individual financial goal, the second individual financial goal, and the joint goal.

4. The system of claim 1, further comprising:
a redistribution component that moves funds from the first financial account to at least the second financial account based on a determination that the first individual goal is overfunded and at least the second individual goal is underfunded.

5. The system of claim 1, further comprises:
a redistribution component that moves funds from at least the second financial account to the first financial account based on a determination that at least the second individual goal is overfunded and the first individual goal is underfunded.

6. The system of claim 1, wherein the first individual financial goal comprises a first target funding date and a first risk tolerance and at least the second individual financial goal comprises a second target funding date and a second risk tolerance level different from the first target funding date and the first risk tolerance.

7. A method, comprising:
receiving, by a system comprising a processor, an indication of a first goal of a first individual user and a first set of attributes associated with the first goal, an indication of a second goal of a second individual user and a second set of attributes associated with the second goal, and an indication of at least one joint goal;
determining, by the system, asset allocation strategies for each of the first goal, the second goal, and the at least one joint goal;
associating, by the system, the first goal with a first financial account and the at least one joint goal, and the second goal with a second financial account, wherein each financial account has a plurality of funding techniques associated with it;
aggregating, by the system, the first goal, the second goal, and the at least one joint goal into a combined goal;
aggregating, by the system, the asset allocation strategies into an overall household strategy to achieve the combined goal, wherein the combined goal is aggregated on a time-based asset allocation for the first and second financial accounts;
simulating, by the system, outcomes for the first and second goals and the joint goal based on the asset allocation strategies, wherein the simulations determine whether the combined goal is likely to be achieved based on the simulation of the first and second individual goals and the joint goal and based on various events and market conditions, the simulations further comprising use of different funding techniques associated with the first and second financial accounts;
inferring, by the system, a set of defined actions to achieve the combined goal, wherein the inferring is based on an explicitly trained statistical classifiers;
presenting to the first or second individual user alternative actions that may increase the likelihood of achieving the combined goal, wherein the alternative actions comprise different asset allocations or funding techniques associated with the first and second financial accounts;
determining, by the system, which, if any, actions should be performed based on input from the user;
tracking, by the system, respective statuses of each defined action of the set of defined actions and a combined status for the combined goal and implementing a change to at least one defined action of the set of defined actions;
providing, by the system, a representation of the combined status and the respective statuses, wherein the combined status and the respective statuses are updated in real-time; and
reallocating, by the system, funds between the first financial account associated with the first goal and the second financial account associated with the at least second goal based on the change to the at least one defined action of the set of defined actions.

8. The method of claim 7, wherein the set of defined actions are separable between a first subset of defined actions for the first goal and at least a second subset of defined actions for at least the second goal.

9. The method of claim 7, further comprising:
redistributing, by the system, funds from the first financial account to at least the second financial account based on a determination that the first goal is overfunded and at least the second goal is underfunded.

10. The method of claim 7, further comprising:
redistributing, by the system, funds from at least the second financial account to the first financial account based on a determination that at least the second goal is overfunded and the first goal is underfunded.

11. The method of claim 7, further comprising:
simulating, by the system, a first outcome of a first subset of defined actions for the first goal and at least a second outcome of a second subset of defined actions for at least the second goal;
determining, by the system, a first confidence level for achieving the first goal based on the first outcome and at least a second confidence level for achieving at least the second goal based on at least the second outcome; and
selectively modifying, by the system, at least a portion of the set of defined actions based on a determination that the first confidence level or at least the second confidence level does not meet a threshold confidence level.

12. The method of claim 7, wherein the providing the representation comprises outputting a planned result that includes a confidence associated with achievement of the first goal, the second goal, the joint goal, or combinations thereof, the confidence is determined based on a simulations performed using different market environments.

13. The method of claim 7, wherein the providing the representation comprises outputting a sum result that includes a level of confidence associated with fulfilling the first goal the second goal, and the joint goal, the sum result also includes a target goal associated with a planned result that indicates a funding level of each of the first goal, the second goal, and the joint goal.

14. The method of claim 7, wherein the first set of attributes comprises a first target funding date and a first risk tolerance and the second set of attributes comprises a second target funding date and a second risk tolerance level different from the first target funding date and the first risk tolerance.

15. A non-transitory computer-readable storage device that stores executable instructions that, in response to execution, cause a system comprising a processor to perform operations, comprising:

receiving a first individual financial goal associated a first individual user, a second individual financial goal associated a second individual user, and at least one joint goal associated with both the first individual user and the second individual user;

determining asset allocation strategies for each financial goal of the individual financial goals and the at least one joint goal;

associating a first financial account with the first individual financial goal and the at least one joint goal and a second financial account with the second financial goal, wherein each financial account has a plurality of funding techniques associated with it;

aggregating the respective asset allocation strategies into an overall household level strategy to achieve a combined goal, wherein the combined goal is aggregated on a time-based asset allocation for the first and second financial accounts;

simulating, by the system, outcomes for the first and second financial goals and the joint goal based on the asset allocation strategies, wherein the simulations determine whether the combined goal is likely to be achieved based on the simulation of the first and second individual goals and the joint goal and based on various events and market conditions, the simulations further comprising use of different funding techniques associated with the first and second financial accounts;

inferring, via an explicitly trained statistical classifier actions that should be implemented, modified, or stopped in order to achieve the overall household level strategy based on the actions or evented determined by the simulations;

presenting to the first or second individual user alternative actions that may increase the likelihood of achieving the combined goal, wherein the alternative actions comprise different asset allocations or funding techniques associated with the first and second financial accounts;

determining, via the explicitly trained statistical classifier, which, if any, actions should be performed based on input from the user;

monitoring the overall household level strategy based on actions associated with the respective asset allocation strategies;

automatically implementing a change to at least one asset allocation strategy of the respective asset allocation strategies based at least in part on the monitoring and inferring;

selectively reallocating funds among the financial accounts associated with the individual financial goals of the individual financial goals based on the change to the at least one asset allocation strategy; and outputting a representation of a holistic view of the individual financial goals as a planned result, a sum result, or both the planned result and the sum result.

16. The non-transitory computer-readable storage device of claim 15, wherein the operations further comprise:

determining a first certainty level associated with an achievement of the first individual goal and at least a second certainty level associated with another achievement of at least the second individual goal; and wherein the planned result includes a confidence associated with the achievement of the first individual goal and at least the second individual goal of the set of individual financial goals, and wherein the sum result includes the first certainty level, at least the second certainty level, and a target goal associated with the planned result that indicates a funding level of each of the first individual goal and at least the second individual goal.

* * * * *